No. 839,700. PATENTED DEC. 25, 1906.
J. N. ANSELL.
COURSE AND BEARING FINDER FOR VESSELS.
APPLICATION FILED JAN. 2, 1906.
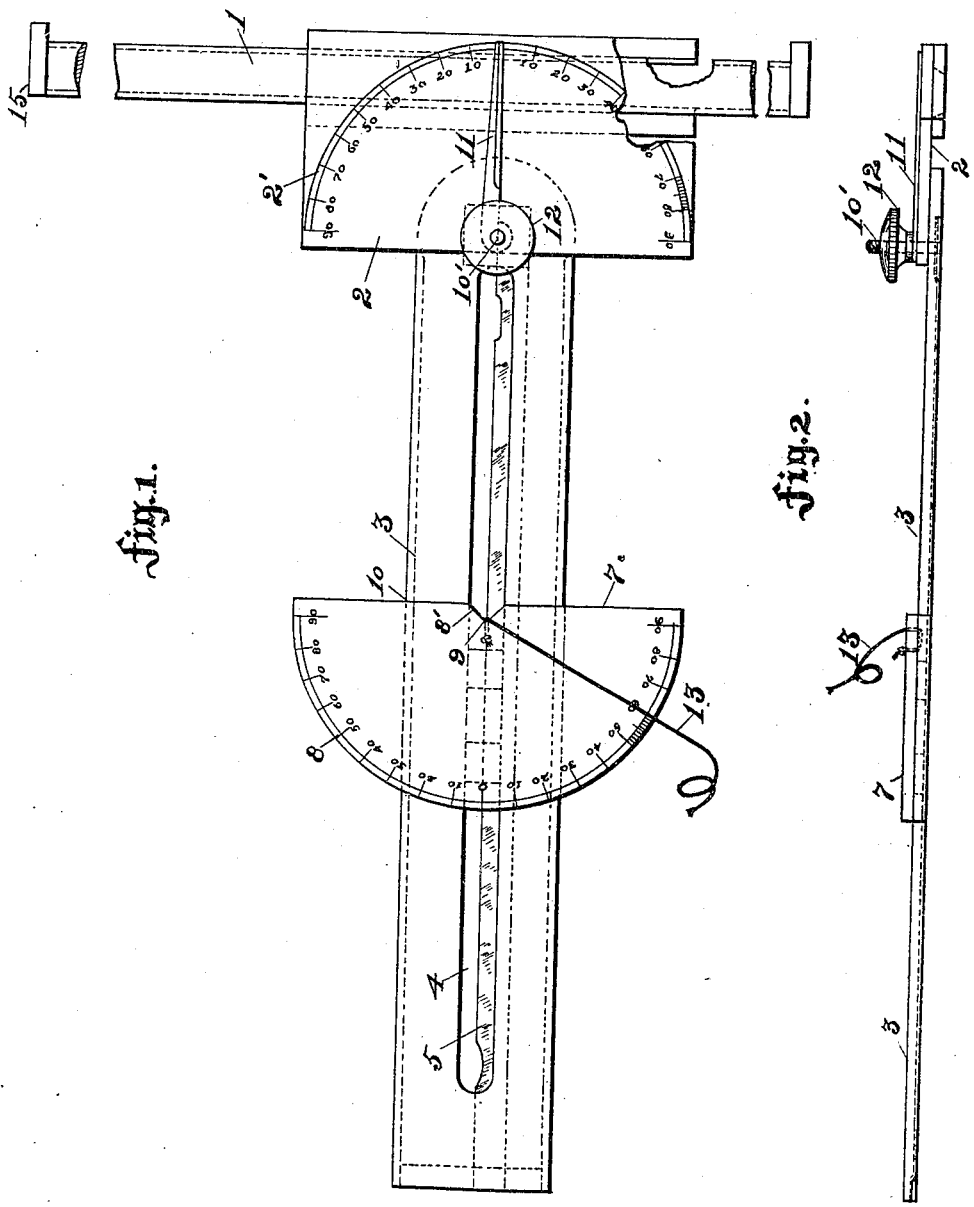

UNITED STATES PATENT OFFICE.

JOHN N. ANSELL, OF SAN FRANCISCO, CALIFORNIA.

COURSE AND BEARING FINDER FOR VESSELS.

No. 839,700. Specification of Letters Patent. Patented Dec. 25, 1906.

Application filed January 2, 1906. Serial No. 294,043.

*To all whom it may concern:*

Be it known that I, JOHN N. ANSELL, a citizen of the United States, residing in the city and county of San Francisco, State of California, have invented certain new and useful Improvements in Course and Bearing Finders for Vessels; and I hereby declare the following to be a full, clear, and exact description of the same.

The present invention relates to an improved device for facilitating the work of a navigator in ascertaining the course in which to steer the vessel, the object of the invention being to dispense with the complicated work at present required on the part of the navigator in order to lay out the position of a vessel on the chart and to determine therefrom the course by which to steer the vessel, one of the essential features of the invention residing in the device carrying its own compass to enable the navigator to read readily therefrom the steering course for the vessel without having to resort to an independent compass or to a compass designated on the navigating-chart for such purpose, thereby eliminating possibility as to the commission of errors in calculation due to the slippage of the parallel rule ordinarily employed by all navigators for such purpose, for the slightest error or fraction as to error in the use of a parallel rule necessitates a recalculation on the part of a navigator for the laying out of the course, the liability of such error in the determination of such fact by the use of parallel rules being obvious when the movement of the vessel or the roll thereof is taken into consideration, likewise the possibility as to the said rule when being employed slipping on the chart, and thereby causing an error in calculation.

To comprehend the invention, reference should be had to the accompanying sheet of drawings, wherein—

Figure 1 is a plan view of the device, the position of the parts being illustrated when locked after having adjusted the same relative to the known position of the vessel; and Fig. 2 is a side view in elevation of the parts disclosed in Fig. 1 of the drawings.

In the drawings the numeral 1 is used to indicate what shall hereinafter be termed a "slide gage-leg," which leg is capable of movement within a suitable guideway formed in the under face of the compass-plate 2, which compass-plate on the upper face thereof contains a quadrant-scale 2' as to degrees of the compass, the same being the usual reading of an ordinary compass.

The reading of the graduated scale on the face of the compass-plate 2 is that of one-half of an ordinary compass. To the under face of this compass-plate there is pivoted, so as to swing, an arm 3, in the center of which arm there is formed a vertical slot 4, which slot extends approximately the full length of the said swinging arm, there being secured, preferably, to the under face of the swinging arm a thin strip 5, which is designed to overlap one edge of the slotted portion of the swinging arm, so as to give a true center line to the said slotted portion, the purpose thereof being to enable the navigator, if he so desires, to use the same as an edge-rule for the running or drawing of a line onto the navigating-chart. This feature is simply a matter of convenience, and may or may not be embodied in the device, as practical working thereof may determine.

On the swinging arm 3 there is mounted to slide thereon a compass-plate 7, which compass-plate, like compass-plate 2, contains a compass-scale 8, as to the reading of degrees. This compass-plate scale of degrees corresponds to the lower half of an ordinary compass, the same, in conjunction with compass-scale on plate 2, forming approximately what would be a complete compass in general use if the two compasses were brought together. In the upper or straight-edge face of the said compass-plate 7 there is formed, preferably, a V-shaped notch 8', the apex 9 of which is in true line with the center of the vertical slot 4, formed in the swinging arm 3. While the drawings disclose the said compass-plate as being provided with a V-shaped notch, it is obvious that any other designating means may be employed or carried by the compass to indicate the center line of the vertical slot formed in the said swinging arm 3, inasmuch as this feature of the slide compass-plate is only to permit the said compass-plate to designate on a chart the accurate point or position as to the known location of the vessel, and for such reason it is not necessary to confine such designator or indicator to a notch in the upper face edge of the compass. The close fit of the swinging arm 3 within the guideway 10, cut in the under face of the slide compass-plate 7, is believed to be sufficient to hold the said slide compass-plate in any of its adjusted positions relative to the arm 3; but it is obvious that should practice demonstrate liability of the compass-plate to generate loose play, so as to cause liability of slippage of the said compass-plate on the said swinging arm, any suitable lock means may be employed to positively lock the said compass-plate in any adjusted positions to the swinging arm. It will be understood that the feature of lock means is a matter to be determined by practical use of the instrument; but, as before stated, it is believed that the snug fit between the said compass-plate and the swinging arm will be sufficient for this purpose.

To the pivotal pin 10' of the swinging arm 3, which pin extends through the compass-plate 2, there is secured a pointer or indicator 11, which pointer or indicator swings in unison with the movement of the said swinging arm 3, so as to designate on the quadrant-scale of the compass-plate the degree due to the swinging of the said arm 3, thereby enabling the navigator to readily read in degrees or fractions thereof the position of the vessel as indicated by the designating-point on the slide compass-plate 7 when the same has been placed on the navigating-chart immediately above the known location of the vessel. For the purpose of locking the swinging arm to the compass-plate 2 or holding the same locked at any desired position there is secured to the pivotal pin 10' or pivotal pin of the swinging arm 3 a thumb-screw 12, which thumb-screw when the swinging arm 3 has been brought to its proper position is screwed down, so as to hold the arm firmly locked to the compass-plate 2, thereby providing against possible displacement as to the position of the said arm relative to the compass-plate 2.

Preference is given to the construction of the device of such material as will be not only durable, but secure extreme lightness; but this is a matter which must be determined by the practical use of the device, or rather to the usages to which the same is subjected during handling. As thus described the device has only indicated to the navigator in degrees or fractions of degrees as to the position of the vessel; but it is necessary in order that the steering course may be determined that means be provided whereby the navigator may "momentarily," so to speak, indicate on either of the compasses the steering-course which the vessel is to travel in order to reach a known point of destination. In the present case this is accomplished by running from the designating point or mark 9 of the compass-plate 7 a flexible extension member 13, which in the present case comprises, preferably, either a thread, string, or a thin wire. By means of this thread, string, or wire the navigator after having properly located the instrument on the navigating-chart to the known position of the vessel simply stretches the same to the known point of the vessel's destination, when the degree or fraction of degree on the said compass-plate 7, bisected by the same, gives an exact reading as to the course to be steered by the navigator of the vessel to reach a given point of destination.

It may be said that the navigator of the vessel has knowledge at all times by means of a reckoning taken at some time during the day as to the known position of the vessel at a certain time, and from that known position it is desired to lay out the course by which to steer the vessel. He either knows by day observations or otherwise as to the meridian of longitude and latitude in which the vessel is located, or this information he has ascertained some time during the day from known headland calculations or from calculations taken from a lighthouse or otherwise. Presuming the last observations of the navigator to have determined the vessel to be in, say, latitude 14 and longitude 124, and the destination of the vessel is south and east, it is only necessary that the navigator so arrange the device on the navigating-chart as to bring the upper straight edge of the compass-plate 2 parallel with the line of latitude 15, for instance, and that the center line or center of the vertical slot in the swinging member or arm 3 covers the graduated degrees on the margin of the said navigating-chart, the lower slide compass-plate 7 being then moved toward the upper fixed compass-plate 2 until the designating-point 9 of the V-shaped notch 8 in the upper edge of said slide compass-plate 7 covers the required line of latitude, or latitude 14. The entire instrument is then shifted until the pointer or indicator 11 points along the required longitude—to wit, longitude 124—when the slide gage-leg 1 is so moved that, say, its inner edge 15 parallels longitude 123, which longitude intersects latitude 14. The parts will then stand so positioned that the swinging arm 3 will be at right angles to the slide gage-leg 1, when the thumb-screw 12 is so turned as to lock the swinging arm 3 to the compass-plate 2 in order to hold the parts in their properly-adjusted positions. When the instrument stands so positioned, the designating-point 9 of the V-shaped notch 8 in the compass-plate 7 will cover on the navigating-chart the known position of the vessel, when in order that the navigator may ascertain the course by which to steer the vessel in order to reach his point of destination it is only required that he so stretch the string, cord, or wire 13 that one portion thereof will bisect, so to speak, the known point of destination on the chart, when he can then readily ascertain by a reading of the degrees or fractions of degrees of the quadrant-scale on the compass-plate 7, bisected by the stretched string, cord, or wire 13, the exact course by which to steer the vessel in order to reach its point of destination.

The parts or members 2 and 7, properly speaking, are protractors; but inasmuch as each member has stamped, printed, or otherwise fixed to the face thereof a double-quadrant compass-scale, each reading from zero to ninety degrees, each member, for the purpose of the present case, shall be termed and designated in the claims as a "compass-plate."

It is obvious that by a similar manner as to the manipulation of the instrument the navigator may readily lay off on the navigating-chart the bearing of a lighthouse or headland and from such laying off of the bearing determine the exact course for the steering of the vessel, as above described.

It will be understood that no attempt has been made in the foregoing to describe the various manipulations of the instrument under varying conditions, for so to do would render the description somewhat complex in its nature. However, from the foregoing brief and concise statement as to the manipulation of the instrument the workings thereof under any and all conditions will be readily apparent to an ordinary navigator.

Having thus described the invention, what is claimed as new, and desired to be protected by Letters Patent, is—

1. An instrument for determining from a navigating-chart the steering course of a vessel, the same consisting of a fixed compass-plate, of an arm or swinging member pivoted thereto of a compass-plate slidably mounted on said swinging arm or member for indicating on a chart a vessel's known position, and of a flexible member carried by the slidable compass-plate, said member adapted to extend to the point of a vessel's destination as designated on a navigating-chart bisecting the scale of the compass and indicating to a navigator the steering course for the vessel to reach such point of destination.

2. An instrument for determining from a navigating-chart the bearing and steering course of a vessel, the same consisting of a fixed compass-plate, of a gage-leg slidably connected thereto, of a swinging arm or member pivoted to said compass-plate, an indicator on the face of the compass-plate actuated by the movement of the swinging arm so as to designate the bearing of a vessel, of means for locking the swinging arm to the fixed compass-plate, of a compass-plate slidably mounted on the swinging arm for indicating the known position of a vessel, and a flexible member carried by the slide compass-plate, said member adapted to extend to the point of the vessel's destination as contained on a navigating-chart, thereby bisecting the scale of the compass and indicating to a navigator the steering course for the vessel to reach such point of destination.

3. An instrument for determining from a navigating-chart the steering course of a vessel, the same consisting of a fixed compass-plate, of a vertically-slotted swinging arm pivoted thereto, of a compass-plate slidably mounted on said arm to cover the known position of a vessel, of a centering-strip for the slotted portion of the swinging arm, and a flexible member carried by the slidable compass-plate, said member bisecting the compass-scale as extended to the point of a vessel's destination as designated on a navigating-chart in order to indicate to a navigator the steering course for the vessel to reach such point of destination.

4. An instrument for determining from a navigating-chart the steering course of a vessel, the same consisting of a fixed compass-plate, of a swinging arm pivoted thereto, of a compass-plate slidably mounted on said arm to cover the known position of a vessel, and means for designating to the navigator of a vessel the steering course thereof to reach its point of destination when the said means covers the said point of destination contained on a navigating-chart, such means bisecting the scale of the compass while covering the point of destination.

5. An instrument for the described purpose, the same comprising a fixed compass-plate and a slidable compass-plate, each plate carrying on the face thereof a compass-scale, an arm carrying the slidable compass-plate pivoted to the fixed compass-plate, an indicator on the face of the fixed compass-plate for designating the bearing of a vessel, said indicator being actuated by the movement of the said arm, the slidable compass-plate registering on a navigating-chart with the known position of the vessel, and means carried by the slide compass-plate for covering on a navigating-chart the vessel's point of destination and at such time bisecting the compass-scale so as to disclose to a navigator the steering course for the vessel in order to reach such point of destination.

In testimony whereof I have hereunto affixed my signature in the presence of witnesses.

JOHN N. ANSELL.

Witnesses:
H. NEUNABER,
KATHERINE M. WILSON.